US012482576B2

(12) United States Patent
Marchione

(10) Patent No.: US 12,482,576 B2
(45) Date of Patent: Nov. 25, 2025

(54) ADJUSTABLE, MULTI-PANEL LEAD ACRYLIC RADIATION BARRIER

(71) Applicant: AADCO Medical, Inc., Randolph, VT (US)

(72) Inventor: Robert L. Marchione, Lebanon, NH (US)

( * ) Notice: Subject to any disclaimer, the term of this patent is extended or adjusted under 35 U.S.C. 154(b) by 483 days.

(21) Appl. No.: 18/086,291

(22) Filed: Dec. 21, 2022

(65) Prior Publication Data

US 2023/0197303 A1 Jun. 22, 2023

Related U.S. Application Data

(60) Provisional application No. 63/292,073, filed on Dec. 21, 2021.

(51) Int. Cl.
*G21F 1/10* (2006.01)
*G21F 3/00* (2006.01)

(52) U.S. Cl.
CPC ................ *G21F 1/106* (2013.01); *G21F 3/00* (2013.01)

(58) Field of Classification Search
CPC . G21F 1/08; G21F 1/085; G21F 1/106; G21F 3/00; G21F 5/00; G21F 7/00
See application file for complete search history.

(56) References Cited

U.S. PATENT DOCUMENTS

2007/0252095 A1* 11/2007 Magram .................. G21F 3/00 250/515.1
2021/0275115 A1* 9/2021 Goldstein .............. A61B 6/107
2022/0243864 A1* 8/2022 Foster .................... A61B 6/107

FOREIGN PATENT DOCUMENTS

CN 211583208 U * 9/2020

* cited by examiner

*Primary Examiner* — David E Smith
(74) *Attorney, Agent, or Firm* — Thomas P. O'Connell; O'Connell Law Firm

(57) ABSTRACT

A radiation barrier provides adjustable protection against radiation incident from multiple directions simultaneously. First and second radiation shields are pivotally retained by an axis post to form a radiation shield assembly. Each radiation shield is formed from radiation shielding material with a lead equivalence. The radiation shields have a closed configuration where the shields are disposed in a nesting relationship to a single side of the axis post with the first radiation shield disposed interior to the second radiation shield. The first radiation shield pivots in a plane laterally displaced from the center axis of the axis post by a distance $D_1$ while the second radiation shield pivots in a plane laterally displaced from the center axis by a greater distance $D_2$. Notches can be disposed in the proximal end portion of the first radiation shield to permit mounting brackets of the second radiation shield to be received therethrough.

21 Claims, 15 Drawing Sheets

44
46
48
50
16
52
54
40
12
42
56
36
58
38
60
62
64
34
30
32

14
20
66
68

ADJUSTABLE, MULTI-PANEL LEAD ACRYLIC RADIATION BARRIER

CROSS-REFERENCE TO RELATED APPLICATIONS

This application claims priority to U.S. Provisional Application No. 63/292,073, filed Dec. 21, 2021, the entirety of which being incorporated herein by reference.

FIELD OF THE INVENTION

The present invention relates generally to radiation shields. More particularly, disclosed herein is a radiation barrier with plural, independently-pivotable radiation shields that provide selectively adjustable protection against exposure to direct and scattered radiation in multiple directions simultaneously. Overhead embodiments of the radiation barrier are selectively repositionable between a raised, storage position and a lowered, use position protective of medical personnel. Alternative embodiments of the radiation barrier are mobile and adjustable in location and configuration again to provide multi-directional protection against direct and scattered radiation.

BACKGROUND OF THE INVENTION

A wide variety of medical procedures involve equipment that emits radiation. For example, in a coronary angiogram, X-ray imaging is employed to visualize the blood vessels of a patient's heart. Radiographic equipment is also used by cardiologists when positioning heart catheters in patients, and fluoroscopic imaging equipment is employed to obtain real-time moving images interior to the body by the application of X-radiation.

Many such procedures require direct contact and interaction between medical personnel and the patient such that medical personnel must normally be in the same room as the patient and the radiation-emitting equipment. As such, medical personnel attending radiographic procedures risk regular exposure to radiation. Such cumulative, long-term radiation exposure can cause significant adverse health effects.

In view of the risks presented by radiation exposure, radiation shields are commonly used during radiographic procedures to reduce exposure. Radiation shields are constructed with radio-opaque materials that significantly reduce the transmission of radiation. Shields of the prior art typically employ a single lead plate or a single panel of lead glass mounted, for instance, to a stand. The shields are positioned between the medical personnel and the primary source of radiation. The shields thus reduce radiation exposure principally from a single direction.

Even with the use of radiation shields, medical personnel are exposed to radiation during radiographic procedures, including because the radiation shielding provided by fixed shield structures is poorly adjustable and is limited to providing protection from radiation incident only from a single direction. Meanwhile, it is known that radiation exposure comes from many radiation sources other than the single direction of the primary source. For example, while radiation from X-rays and other sources travels in straight lines, radiation incident on a given object will often be only partially absorbed based, for instance, on the physical mass of the object and the energy level of the radiation. The balance of the radiation is scattered in random directions. With this, one significant secondary radiation source is radiation transmitted through and reflected by the patient, even through the extremities of the patient. Radiation may also be reflected and scattered by other objects, including the table supporting the patient and the walls of the room.

Cumbersome protective clothing, such as lead aprons, thyroid collars, and leaded glasses, can be worn to reduce radiation exposure. However, even these do not provide full coverage. Particularly over extended time periods, exposure even to reduced radiation levels is dangerously toxic.

Consequently, as the present inventor has appreciated, effective radiation shielding is a multi-directional need. Therefore, particularly in view of the dangers of long-term exposure to radiation during medical procedures, it is apparent that there is an important need for providing effective and adaptable protection to medical personnel from radiation, including reflected and scattered radiation, incident from multiple directions simultaneously.

SUMMARY OF THE INVENTION

With an awareness of the need for providing effective protection to medical personnel against radiation exposure during medical procedures, the present inventor set forth with the basic object of providing a radiation barrier capable of providing protection against radiation incident from multiple directions simultaneously.

A further object of the invention is to provide a radiation barrier that is adjustable in location and configuration to provide adaptable radiation protection during medical procedures.

A related object of the invention is to provide a radiation barrier that provides multi-directional protection against primary and secondary sources of radiation.

A further object of embodiments of the invention is to provide a radiation barrier that can be adjusted and adapted to varying medical procedures, patients, and medical situations.

These and further objects and advantages of the present invention will become obvious not only to one who reviews the present specification and drawings but also to those who have an opportunity to experience an embodiment of the radiation barrier disclosed herein in practice. However, it will be appreciated that, while the accomplishment of each of the foregoing objects in a single embodiment of the invention may be possible and indeed preferred, not all embodiments will seek or need to accomplish each and every potential advantage and function. Nonetheless, all such embodiments should be considered within the scope of the present invention.

In carrying forth one or more objects of the invention, one embodiment of the adjustable radiation barrier provides adjustable protection during radiographic procedures against radiation incident from multiple directions simultaneously through a first radiation shield and a second radiation shield that are retained for independent pivoting by an axis post. Each radiation shield is formed from a radiation shielding material with a lead equivalence, and each radiation shield has a proximal end portion and a distal end portion. The first and second radiation shields together form a radiation shield assembly in which the first and second radiation shields are selectively pivotable in relation to one another to permit an adjustment of a profile, size, and shape of a radiation protective area provided by the radiation barrier.

Certain embodiments of the radiation barrier further include a support arm that retains the axis post and an arm support operative to support the support arm. The support arm can have a proximal arm section and a distal arm section with the proximal arm section pivotable about perpendicular and horizontal axes in relation to the arm support, the distal arm section pivotable in relation to the proximal arm section, and the proximal arm section and the distal arm section incorporating parallel movement mechanisms whereby the radiation shield assembly can be readily adjusted in height and location in relation to a patient.

In particular manifestations of the radiation barrier, the first and second radiation shields are formed from transparent lead acrylic with a lead equivalence of at least approximately 0.3 mm. Preferably, the first and second radiation shields are formed from a radiation shielding material with a lead equivalence of at least approximately 1.0 mm.

To accommodate a portion of a body of a patient, the first or second radiation shield can have a receiving indentation disposed in a lower portion thereof adapted to engage a body of a patient. Further protection against radiation exposure can be provided by a flexible skirt that incorporates radiation shielding material and that lines the receiving indentation.

As disclosed herein, the first and second radiation shields can have a closed configuration in which the first and second radiation shields are disposed in an overlapping relationship with facing surfaces thereof in immediate proximity and an extended configuration where the first and second radiation shields extend in 180-degree opposition. The first and second radiation shields can be adjusted to any relationship between and beyond the closed and extended configurations to provide protection against radiation exposure.

Also according to embodiments of the invention, the first and second radiation shields can have a closed configuration wherein the first and second radiation shields are disposed in a nesting relationship with the proximal end portions of both the first and second radiation shields disposed to a single side of the axis post and with the first radiation shield disposed interior to the second radiation shield. More particularly, wherein the axis post is considered to have a center axis, the first radiation shield can pivot about the axis post in a plane laterally displaced from the center axis by a distance $D_1$ while the second radiation shield pivots about the axis post in a plane laterally displaced from the center axis by a distance $D_2$ and with the distance $D_2$ being greater than the distance $D_1$. For example, the distance $D_2$ can be greater than the distance $D_1$ by a dimension sufficient to permit the first radiation shield to be pivoted into position interior to and in immediate facing juxtaposition with the second radiation shield in a plane parallel thereto.

In embodiments of the radiation barrier, the first radiation shield is pivotally retained relative to the axis post by upper and lower mounting brackets, and the second radiation shield is likewise pivotally retained relative to the axis post by upper and lower mounting brackets. The mounting brackets that pivotally retain the second radiation shield have a depth, which can be measured as the distance by which the mounting brackets space the second radiation shield from the axis post, greater than a depth of the mounting brackets that pivotally retain the first radiation shield by a dimension corresponding to the difference between the distance $D_2$ and the distance $D_1$.

Still further, it is taught herein that, where the first and second radiation shields are each pivotally retained relative to the axis post by upper and lower mounting brackets, one of the first and second radiation shield can have notches in the proximal end portion thereof for receiving the mounting brackets of the other of the first and second radiation shields therethrough when the first and second radiation shields are disposed in the fully-closed configuration. For example, notches can be disposed in the proximal end portion of the first radiation shield for receiving the mounting brackets of the second radiation shield therethrough when the shields are disposed in the fully-closed configuration.

Still more particularly, the notches can be disposed in upper and lower corners of the proximal end portion of the first radiation shield, and the upper and lower mounting brackets that pivotally retain the second radiation shield can be positioned to be received through the notches in the upper and lower corners of the proximal end portion of the first radiation shield when the first and second shields are in the closed configuration. In such embodiments, the mounting brackets that pivotally retain the first radiation shield can, for example, be disposed longitudinally interior to the notches disposed in the upper and lower corners of the proximal end portion of the first radiation shield.

The radiation barrier can in certain embodiments further comprise a support mast with the axis post being retained by the support mast. The support mast could itself be floor or ceiling supported. In practices of the invention, the support mast can have a distal or upper mast section that is telescopingly received into a proximal or lower mast section, and a height locking mechanism can be operative to selectively lock the distal mast section at a given degree of extension relative to the proximal mast section. Still further, a rotation lock can be operative to selectively fix the first and second radiation shields against pivoting relative to the axis post. The rotation lock can, for instance, take the form of a reception slot fixedly retained by the proximal mast section.

One will appreciate that the foregoing discussion broadly outlines the more important goals and certain features of the invention to enable a better understanding of the detailed description that follows and to instill a better appreciation of the inventor's contribution to the art. Before any particular embodiment or aspect thereof is explained in detail, it must be made clear that the following details of construction and illustrations of inventive concepts are mere examples of the many possible manifestations of the invention.

DETAILED DESCRIPTION OF PREFERRED EMBODIMENTS

The adjustable, multi-panel radiation barrier disclosed herein is subject to a wide variety of embodiments, each within the scope of the invention. However, to ensure that one skilled in the art will be able to understand and, in appropriate cases, practice the present invention, certain preferred embodiments of the broader invention revealed herein are described below and shown in the accompanying drawing figures.

Figure 1:
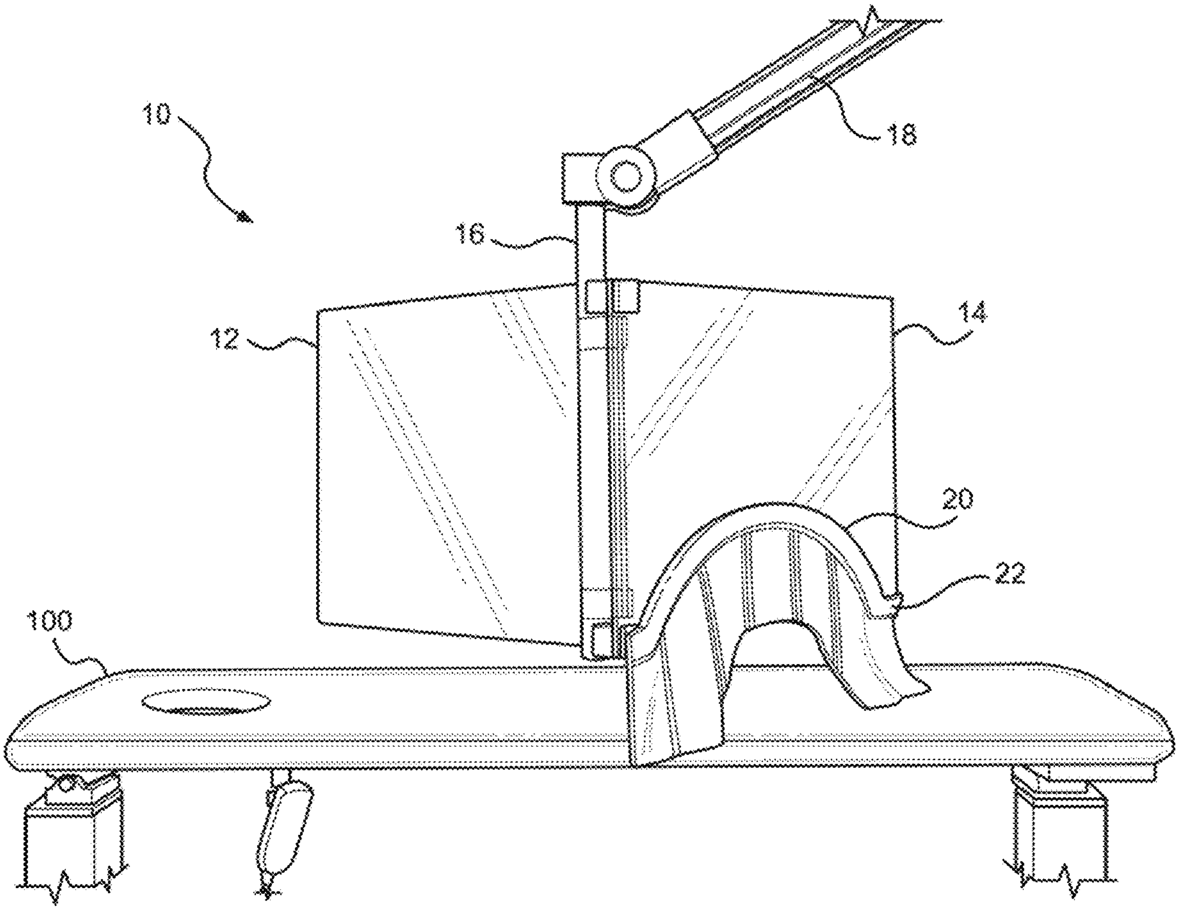
FIG. 1 is a perspective view of an adjustable, multi-panel overhead radiation barrier as disclosed herein positioned in relation to a treatment table.
Figure 2:
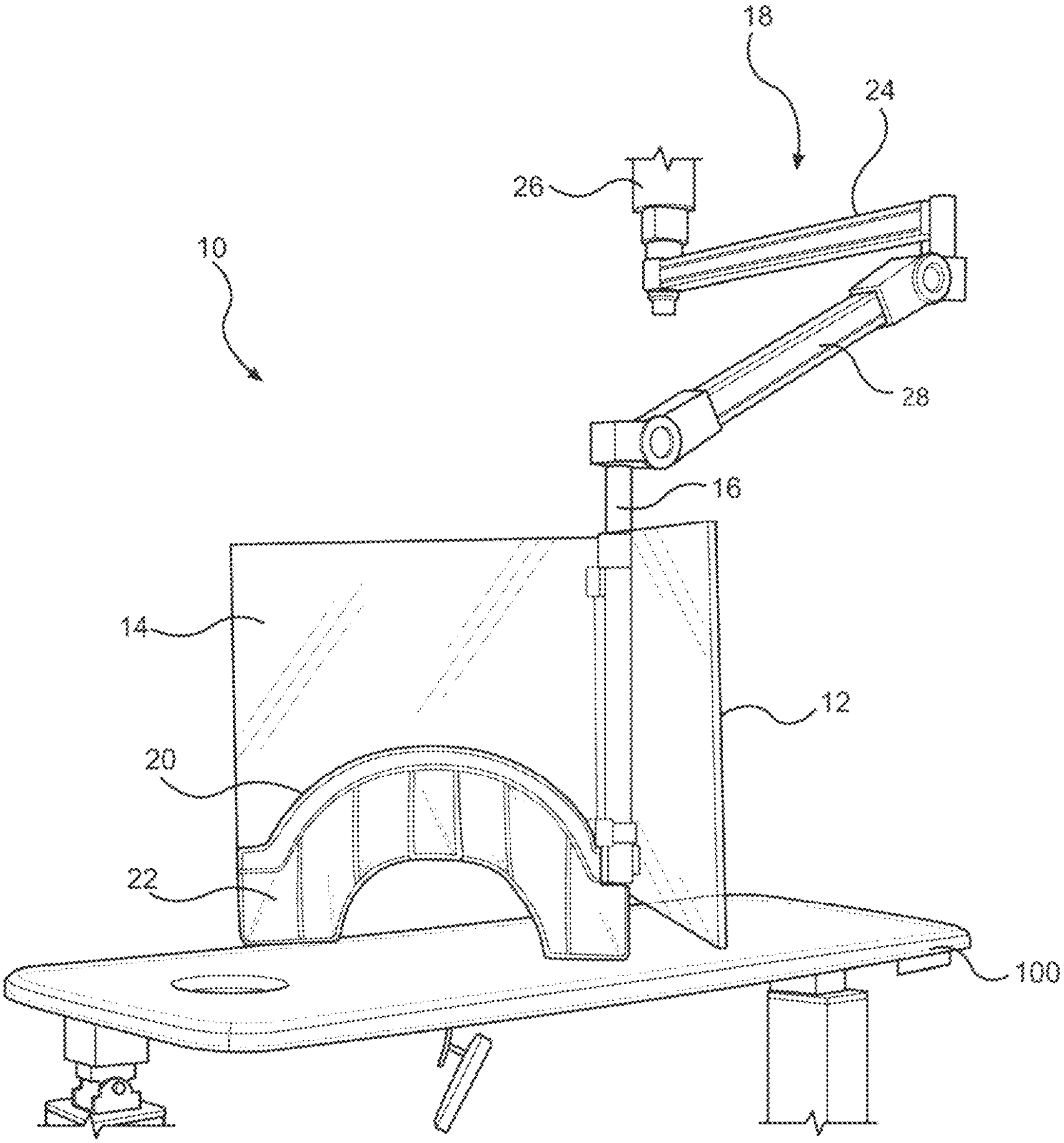
FIG. 2 is a perspective view of the overhead radiation barrier alternatively positioned in relation to the treatment table.
Figure 3:
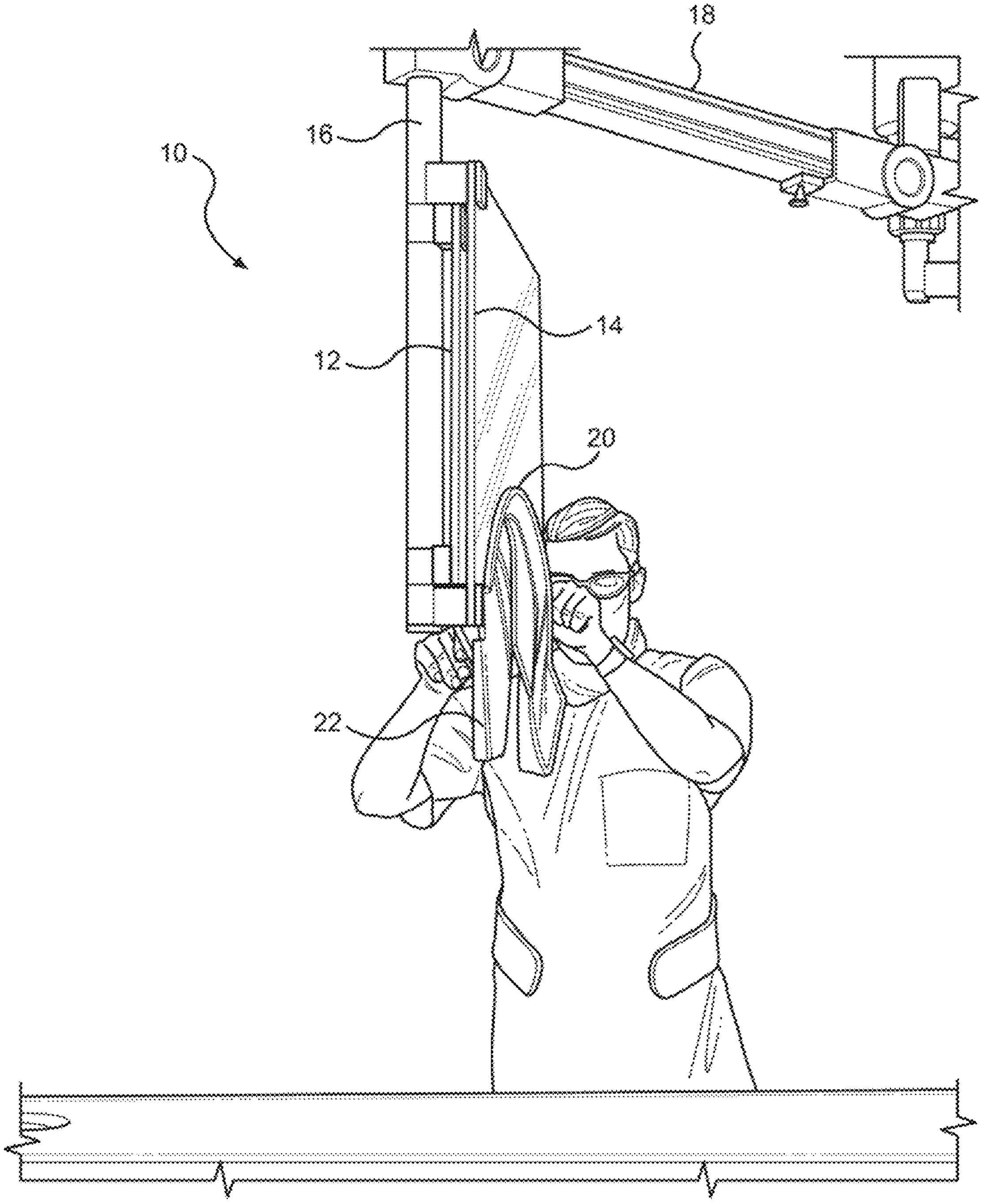
FIG. 3 is a perspective view of the overhead radiation barrier in a closed configuration above the treatment table.
Figure 4:
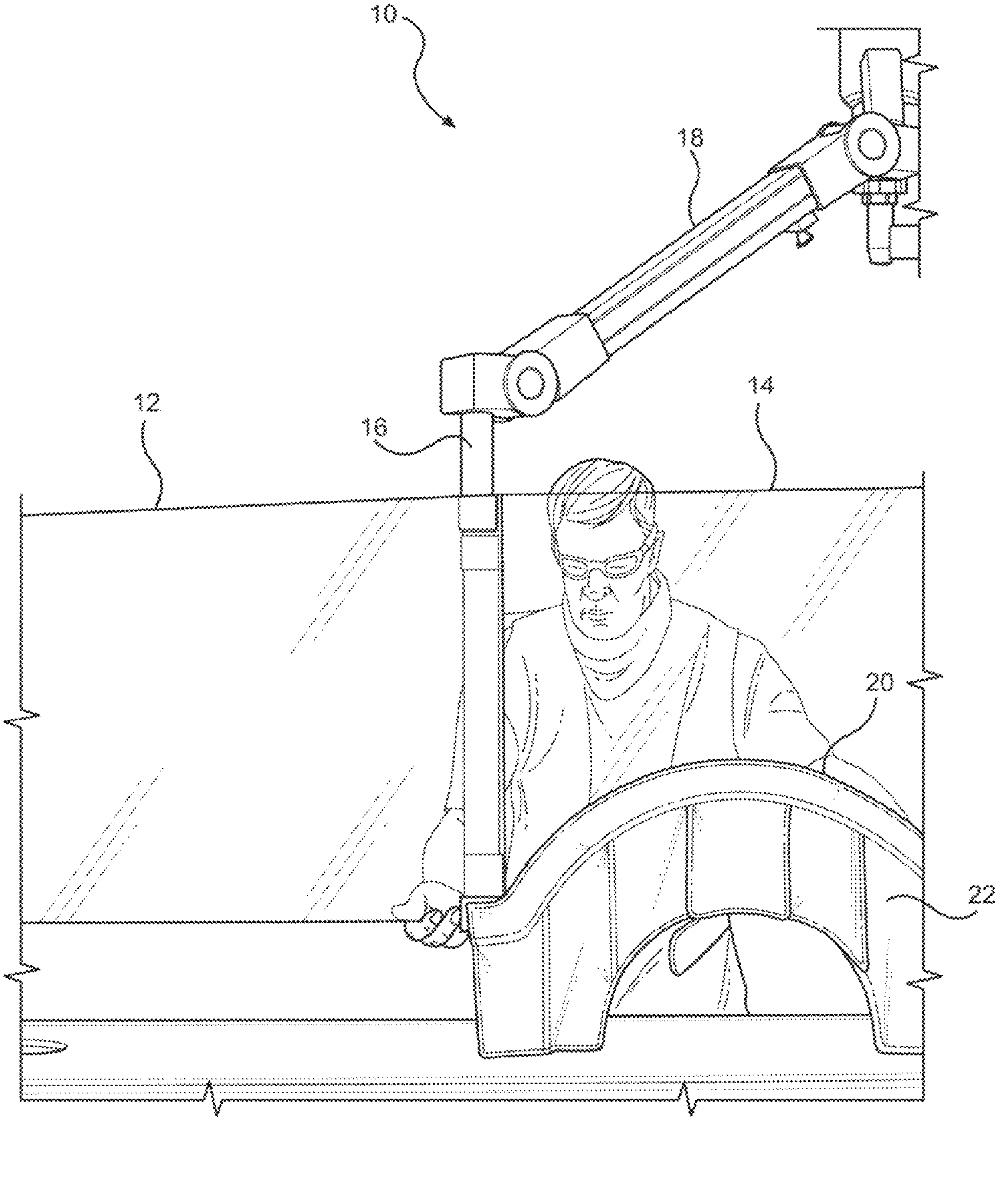
FIG. 4 is a perspective view of the overhead radiation barrier during a stage of positioning in relation to the treatment table.

Turning more particularly to the drawings, an embodiment of the adjustable, multi-panel overhead radiation barrier is indicated generally at 10 in FIGS. 1 through 4. There, the radiation barrier 10 has first and second radiation shields 12 and 14 that are hingedly supported at the proximal end portions thereof by an axis post 16 to form a shield assembly. The shield assembly is retained by a support arm 18. Under this configuration as basically described, the shield assembly can be readily repositioned from a raised and collapsed storage configuration, such as is shown in FIG. 3, to a use configuration, such as in proximity to a treatment table 100 as, for instance, in FIGS. 1, 2, and 4. The overhead radiation barrier 10 thus provides adjustable protection against radiation coming from multiple directions simultaneously during medical procedures involving the operation of radiographic equipment.

Figure 19:
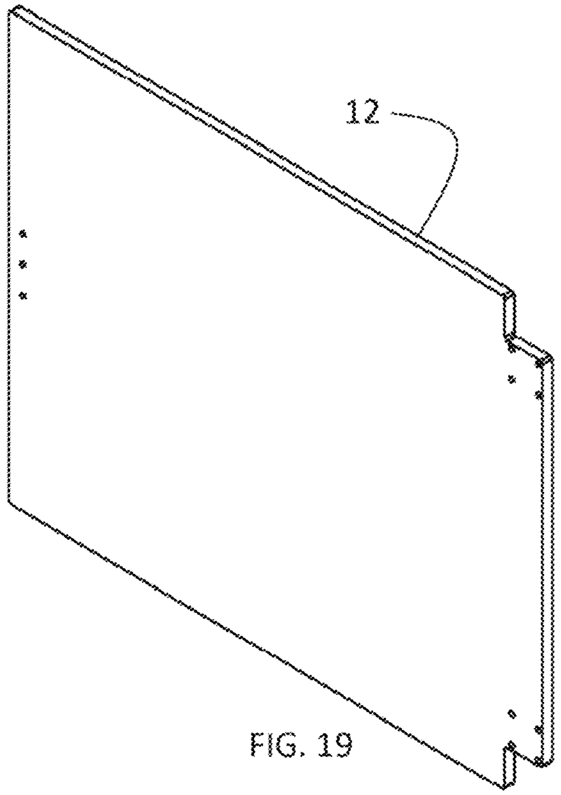
FIG. 19 is a perspective view of a first radiation shield of the shield assembly.
Figure 20:
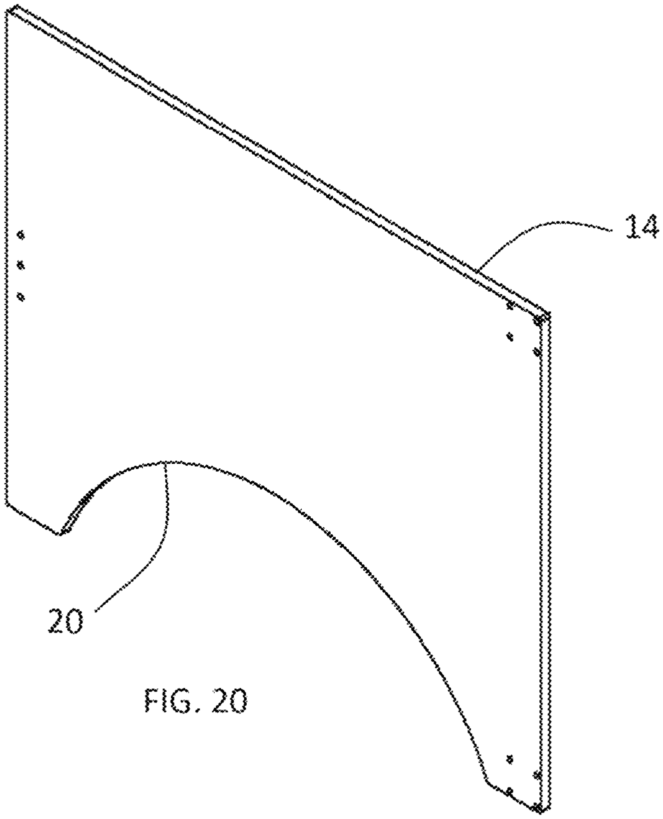
FIG. 20 is a perspective view of a second radiation shield of the shield assembly.

The first and second radiation shields 12 and 14, which are shown apart from the remainder of the radiation barrier 10 in FIGS. 19 and 20, are each formed from a transparent radiation shielding material. Any transparent radiation shielding material that now exists or that may hereafter be developed should be considered to be within the scope of the invention except as the claims may be expressly limited. In certain, non-limiting embodiments, the radiation shields 12 and 14 are formed from transparent lead acrylic material or lead glass material with a lead equivalence of at least approximately 0.3 mm and preferably approximately 1.0 mm lead equivalence. Greater or lesser equivalence may be incorporated dependent on any relevant factor, including anticipated radiation levels and other factors. As used herein, the term "transparent" should be interpreted to include radiation shielding material that allows light to pass through it so that objects can be seen through the material. It does not exclude tinting, coating, or other surface or material properties that do not prevent objects from being perceived through the radiation shields 12 and 14.

The first and second radiation shields 12 and 14 are depicted apart from the remainder of the overhead radiation barrier 10 in FIGS. 19 and 20 respectively. As shown in FIG. 19, the first radiation shield 12 is generally rectangular with upper and lower rectangular corner notches in what may be considered the upper and lower proximal corners thereof. As FIG. 20 illustrates, the second radiation shield 14 is also generally rectangular but does not have corner notches. An arcuate receiving indentation 20 is disposed in the lower peripheral edge of the second radiation shield 14.

While first and second radiation shields 12 and 14 are shown in the depicted embodiments, it will be understood that practices of the invention could include additional radiation shields. Except as expressly limited by the claims, such embodiments of the radiation barrier 10 should be considered to be within the scope of the invention.

As shown in FIGS. 1 through 4, the receiving indentation 20 is lined with a flexible radiation skirt 22. The radiation skirt 22 has radiation shielding properties and is operative to shield against transmitted radiation. The radiation skirt 22 can, for instance, be formed from radiation shielding material. Additionally or alternatively, radiation shielding material can be incorporated into the radiation skirt 22. By way of example, the skirt 22 can incorporate lead lining or another material protective against radiation.

In the depicted embodiment, the skirt 22 is contoured to correspond in its upper periphery to the arcuate shape of the receiving indentation 20. The lower periphery of the skirt 22 likewise has an arcuate receiving indentation therein as might be advantageous to corresponding generally to the torso, legs, head, or another body part of a patient lying on the treatment table 100. The skirt 22 can be segmented or pleated as is illustrated to conform further to the body of a patient to provide optimal radiographic shielding.

In the embodiment of FIG. 2, the support arm 18 can be seen to have a proximal arm section 24 and a distal arm section 28. The proximal arm section 24, and thus the support arm 18 in general, is supported by an arm support 26. The proximal arm section 24 is pivotable about perpendicular and horizontal axes in relation to the arm support 26. The proximal arm section 24 has a parallel movement mechanism that establishes and maintains a vertical pivot axis at the distal end thereof for pivotally engaging the distal arm section 28. The distal arm section 28 likewise has a parallel movement mechanism that establishes and maintains a vertical pivot axis at the distal end thereof for pivotally engaging the axis post 16 and thus the shield assembly in general.

In contemplated embodiments of the overhead radiation barrier 10, the support arm 18 is calibrated to support weights in the range of 100 pounds in an adjustable manner by operation of a purpose-built counterpoised support arm assembly 18. Under this structure, the first, second, and potentially further radiation shields 12 and 14 can be stably and adjustably retained. The shield assembly can be raised, lowered, and rotated to provide radiation shielding over a continuous range of vertical, lateral, longitudinal, and rotational motion.

Figure 5:
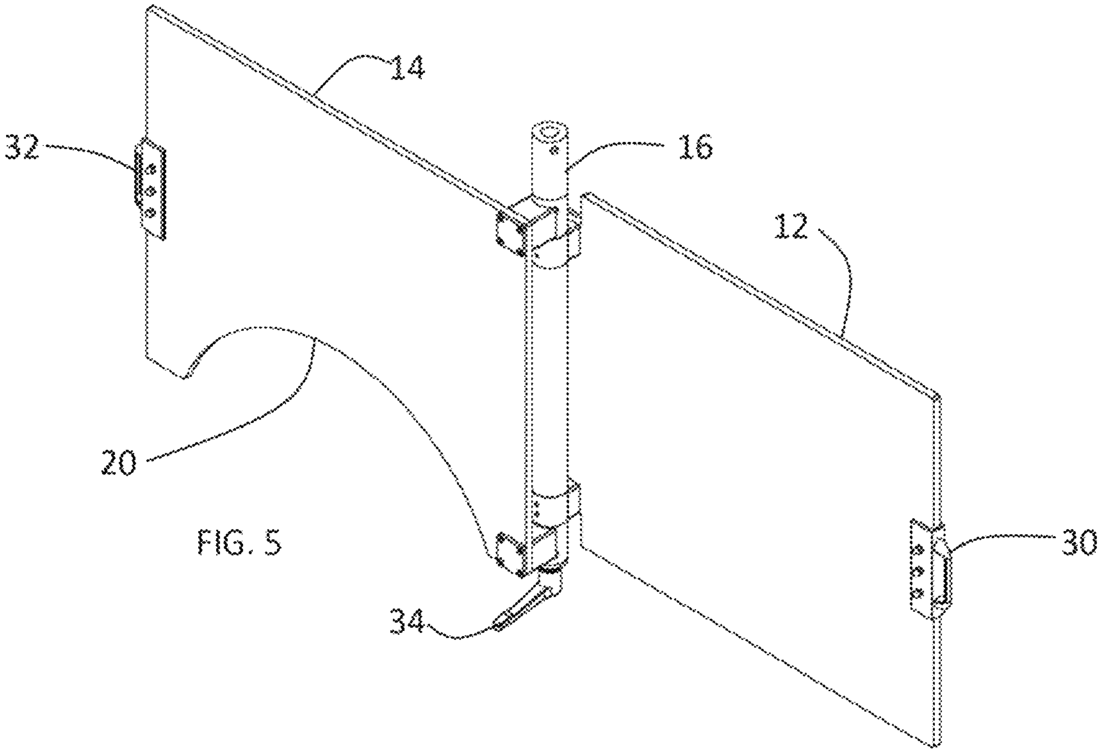
FIG. 5 is a perspective view of the shield assembly of an embodiment of the adjustable, multi-panel overhead radiation barrier with the radio-opaque shields in a first use configuration.
Figure 7:
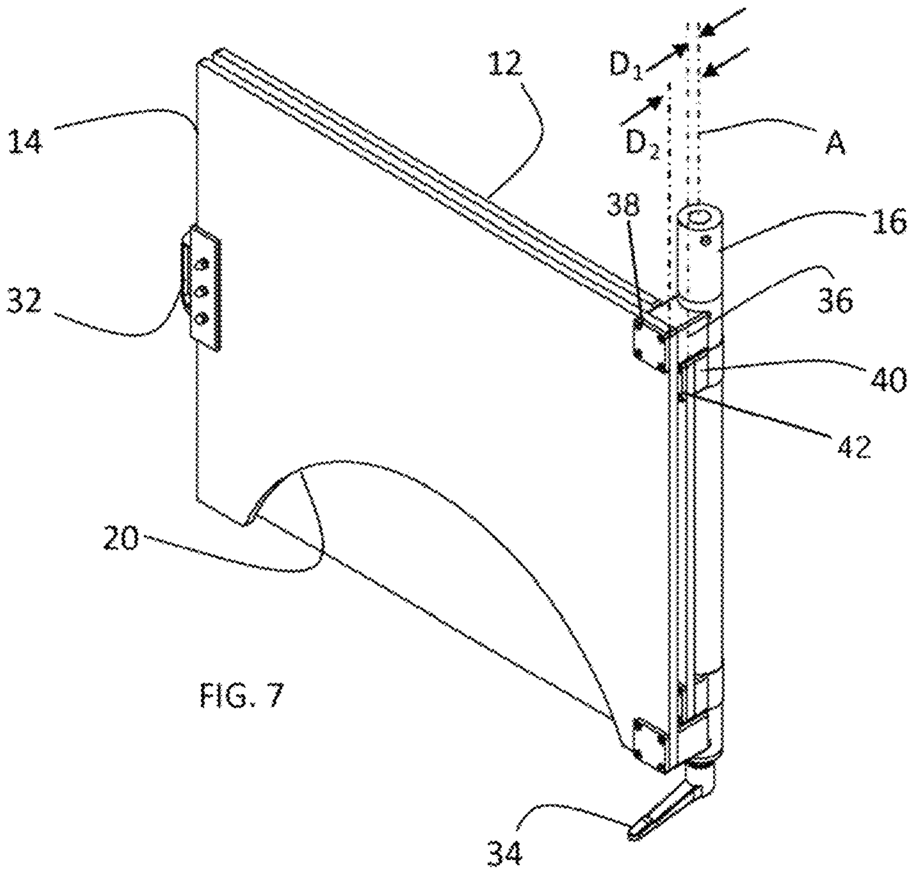
FIG. 7 is a perspective view of the shield assembly of the overhead radiation barrier with the radiopaque shields in a closed configuration.

The first and second radiation shields 12 and 14 are pivotable in relation to the axis post 16 and in relation to one another. As shown in FIGS. 3 and 7, the first and second radiation shields 12 and 14 have what may be referred to as a fully-closed configuration in which the shields 12 and 14 are disposed in parallel, matching orientations in a fully overlapping relationship with both shields 12 and 14 disposed to the same side of the axis post 16 and with the first shield 12 disposed interior to the second shield 14 relative to the axis post 16. In the fully-closed configuration, the facing surfaces of the first and second radiation shields 12 and 14 are disposed in substantially parallel planes and in immediate proximity to one another. The fully-closed configuration may, for instance, be employed during storage of the radiation barrier 10. The fully-closed configuration may also be used where the enhanced protection provided by double shield layers may be desired. The first and second radiation shields 12 and 14 can alternatively be positioned in the fully-extended configuration of FIG. 5. In the fully-extended configuration, the shields 12 and 14 extend in 180-degree opposition.

Figure 6:
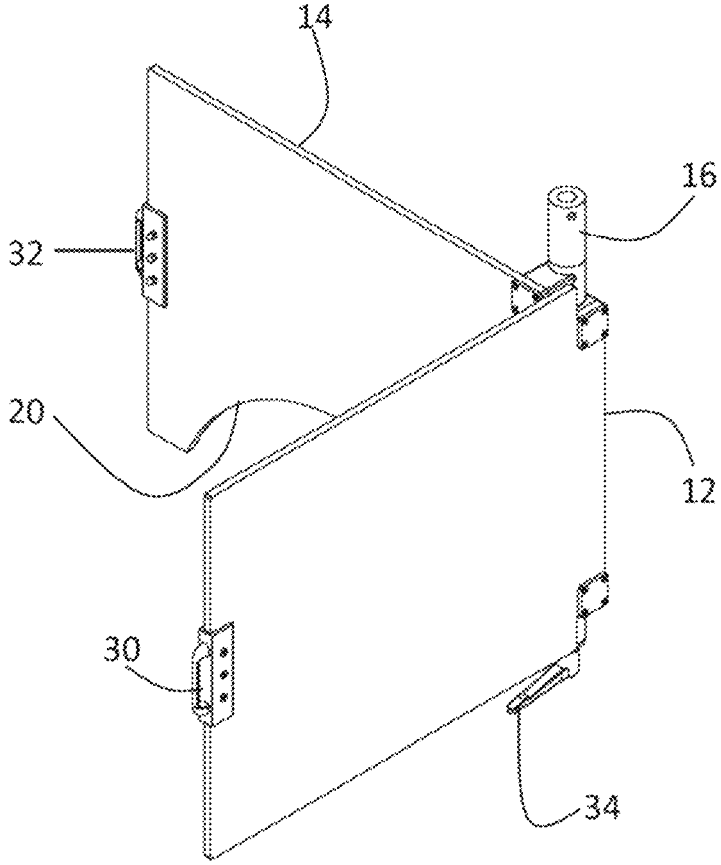
FIG. 6 is a perspective view of the shield assembly of the overhead radiation barrier with the radiopaque shields in a second use configuration.

The shields 12 and 14 can be individually and collectively pivoted to pursue any configuration, including the fully-extended configuration, the fully-closed configuration, and substantially any other angular relationship between the zero degree, fully-closed configuration and a near or actual 360-degree pivoting of either or both shields 12 and 14. By way of non-limiting example, the first and second radiation shields 12 and 14 can be pivoted to the use configuration of FIG. 6 where the shields 12 and 14 are disposed in an approximately 90-degree relationship. As is further suggested by FIGS. 1, 2, and 4, the shield assembly formed by the first and second shields 12 and 14 can thus be adjusted over a continuous range to provide radiation protection over widely varied positions and orientations along and in relation to a treatment table 100 or any other location. Where medical personnel previously contended with the specter of scattered radiation passing around fixed, single-panel radiation shields, the adjustable overhead radiation barrier 10 provides continuous, multi-directional radiation protection that is readily adjustable to adapt to individual patients, procedures, equipment, and other factors.

Figure 8:
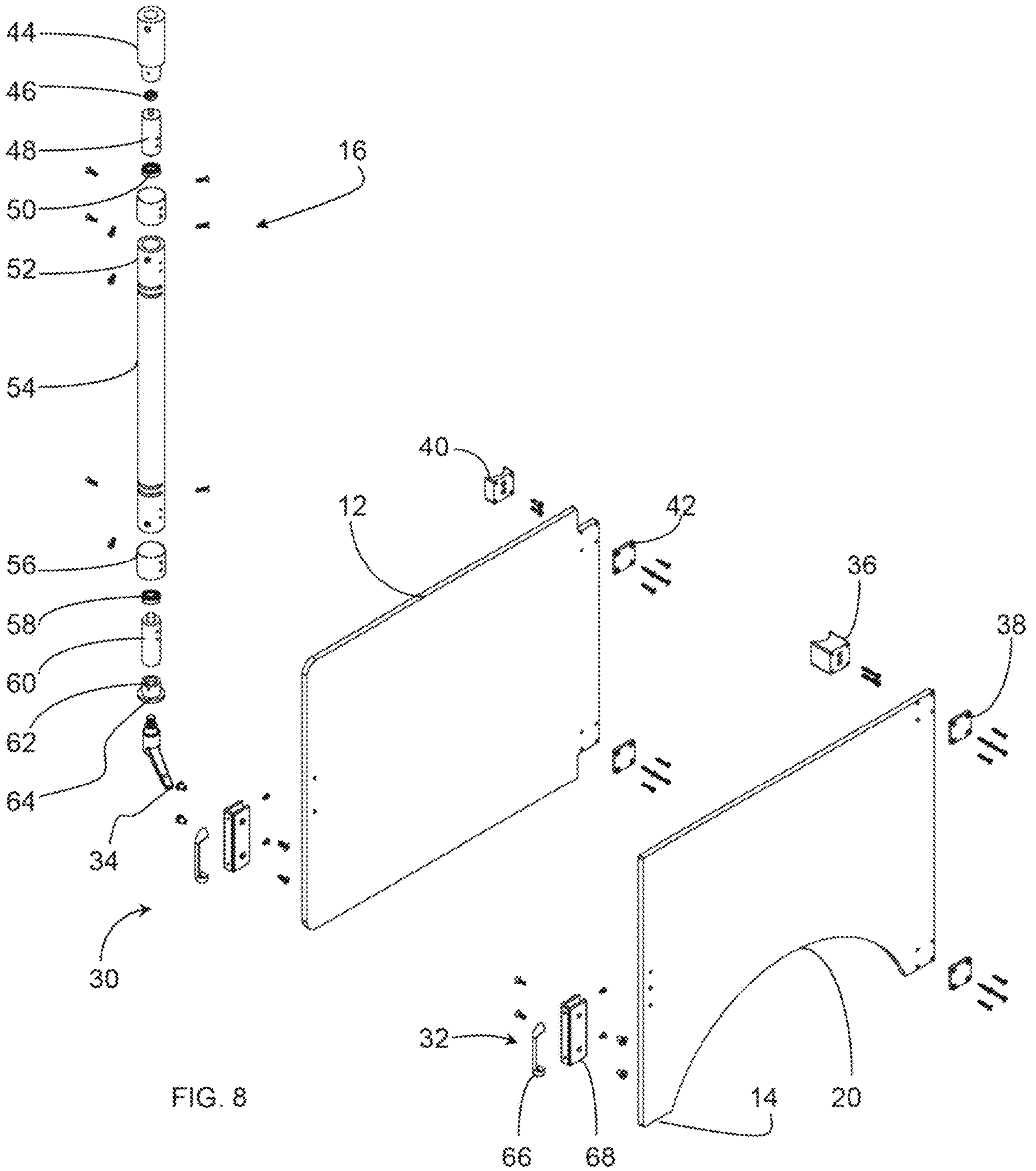
FIG. 8 is an exploded perspective view of the shield assembly of the overhead radiation barrier.
Figure 9:
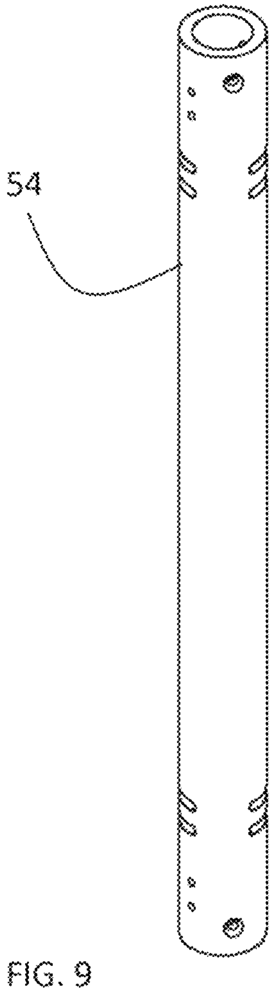
FIG. 9 is a perspective view of an outer shaft of the shield assembly.
Figure 17:
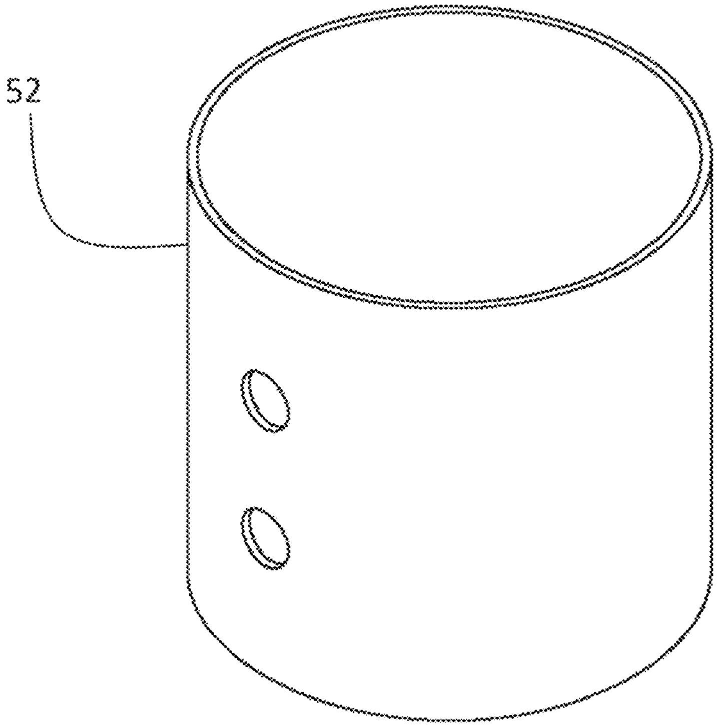
FIG. 17 is a perspective view of a rotatable cover of the shield assembly.

The depicted embodiment of the radiation barrier 10 employs a nesting plate configuration. By virtue of the nesting plate configuration, the first and second shields 12 and 14, which are planar in this embodiment, can be positioned in immediate proximity to one another with the hinge components secured to the proximal end portion of the second shield 14 received through the upper and lower rectangular notches in the proximal end portion of the first shield 12 and again with both shields 12 and 14 disposed to the same single side of the axis post 16 with the first shield 12 disposed interior to the second shield 14 relative to the axis post 16. As shown in FIG. 8, for instance, the first shield 12 is pivotally retained relative to the axis post 16 by upper and lower mounting brackets 40 fixed to the proximal end portion of the first shield 12 together with upper and lower mounting plates 42 with the first shield 12 disposed therebetween. Fasteners pass through the mounting plates 42, the first shield 12, and the mounting brackets 40 to engage upper and lower rotatable covers 52 and 56 of the axis post 16. A rotatable cover 52 is shown alone in FIG. 17. The covers 52 and 56 are adapted to rotate relative to the outer shaft 54 of the axis post 16, which itself is shown apart in FIG. 9. In a similar manner, the second shield 14 is pivotally retained relative to the axis post 16 by upper and lower mounting brackets 36 fixed to the proximal end portion of the second shield 14 together with upper and lower mounting plates 38 with the second shield 14 disposed therebetween. Fasteners pass through the mounting plates 38, the second shield 14, and the mounting brackets 36 to engage the outer shaft 54 of the axis post 16. As shown in FIG. 7, the proximal end portions of the first and second shields 12 and 14 are thus both disposed to the same side of the axis post 16 when the first and second radiation shields 12 and 14 are in the fully-closed configuration with the first shield 12 disposed inward of the second shield 14 relative to the axis post 16.

Figure 10:
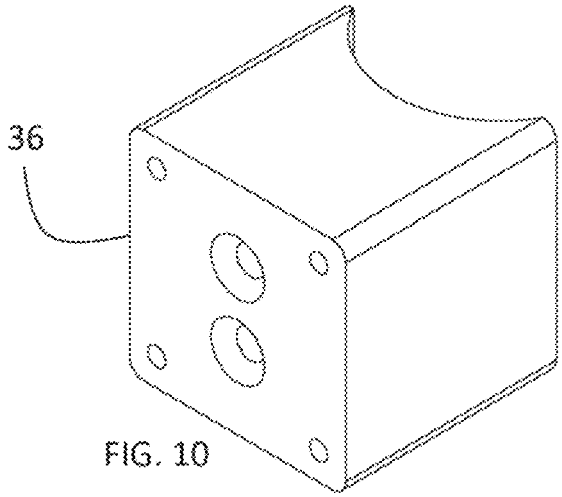
FIG. 10 is a perspective view of a mounting bracket of the shield assembly.
Figure 11:
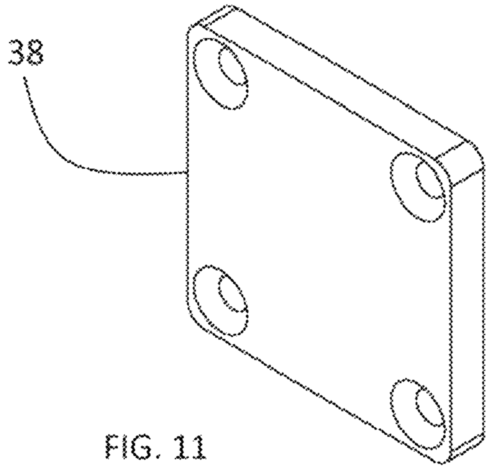
FIG. 11 is a perspective view of a mounting plate of the shield assembly.
Figure 12:
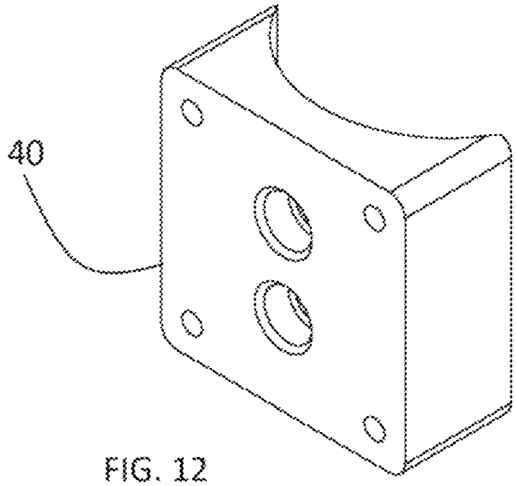
FIG. 12 is a perspective view of a further mounting bracket of the shield assembly.
Figure 13:
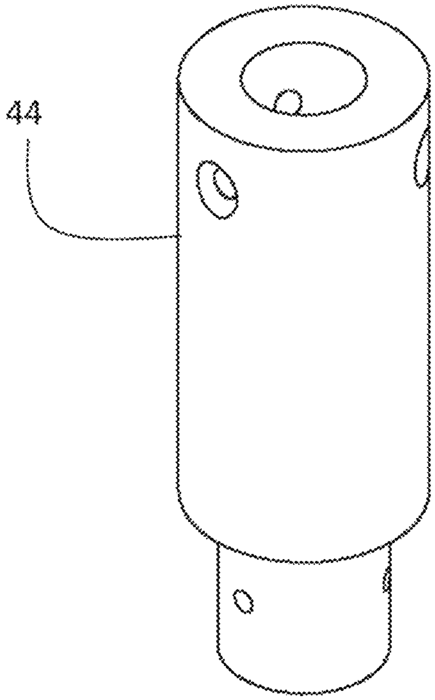
FIG. 13 is a perspective view of a top connector of the shield assembly.
Figure 14:
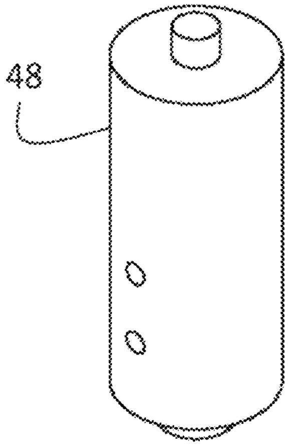
FIG. 14 is a perspective view of an upper internal shaft of the shield assembly.
Figure 15:
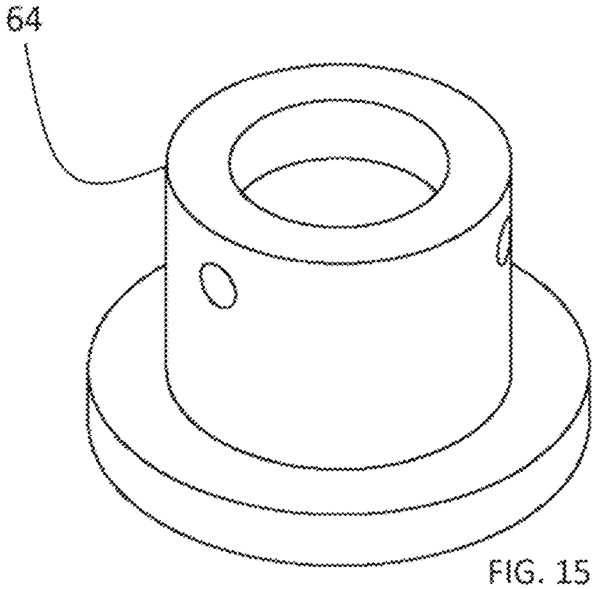
FIG. 15 is a perspective view of a lower cap of the shield assembly.
Figure 16:
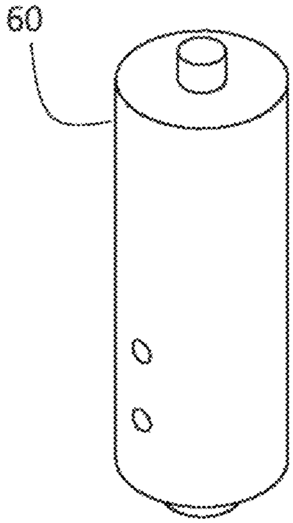
FIG. 16 is a perspective view of a lower internal shaft of the shield assembly.

As shown apart in FIGS. 10 and 12, each mounting bracket 36 and 40 has an arcuate inner portion for conforming to and engaging the annular axis post 16. As shown in FIG. 11 in relation to the mounting plate 38, each mounting plate 38 and 42 has a flat face for contacting the planar surfaces of the respective first and second shields 12 and 14. Upper and lower internal shafts 48 and 56, which are shown alone in FIGS. 14 and 16, are rotatable within the outer shaft 54 with bearings 46, 50, 58, and 62 as shown in FIG. 8 facilitating smooth rotation of the first and second shields 12 and 14. A top connector 44, which is shown alone in FIG. 13, is secured atop the outer shaft 54 to be retained by the distal end of the support arm 18, and a lower cap 64, which is shown alone in FIG. 15, is secured at the lower end of the outer shaft 54.

To facilitate the nesting configuration of the first and second shields 12 and 14 and the hardware that retains the same relative to the axis post 16, the mounting plates 42 and the mounting brackets 40 of the first shield 12 are disposed along the axis post 16 longitudinally inward of and proximal to the rectangular notches in the first shield 12, and the mounting plates 38 and the mounting brackets 36 of the second shield 14 are disposed to align longitudinally with the rectangular notches in the first shield 12. Thus, when the first and second shields 12 and 14 are disposed in a fully closed configuration as in FIG. 7, the upper and lower brackets 36 of the second shield 14 are received to pass into and through the rectangular notches in the first shield 12.

Each of the first and second shields 12 and 14 is selectively pivotable about the axis post 16. As shown in FIG. 7, the axis post 16 can be considered to have a center axis A. Further facilitating the nesting of the first and second shields 12 and 14, the first radiation shield 12 pivots about the axis post 16 in a plane laterally displaced from the center axis A by a radial distance $D_1$ while the second radiation shield 14 pivots about the axis post 16 in a plane laterally displaced from the center axis A by a radial distance $D_2$. The distance $D_2$ is greater than the distance $D_1$ by a dimension sufficient to permit the first radiation shield 12 to be pivoted into position interior to and in immediate facing juxtaposition with the second radiation shield 14 and in a plane parallel thereto. To establish this relationship, the mounting brackets 36 of the second shield 14 have a depth greater than the depth of the mounting brackets 40 of the first shield 12 by a dimension corresponding to the difference between the distance $D_2$ and the distance $D_1$.

Figure 18:
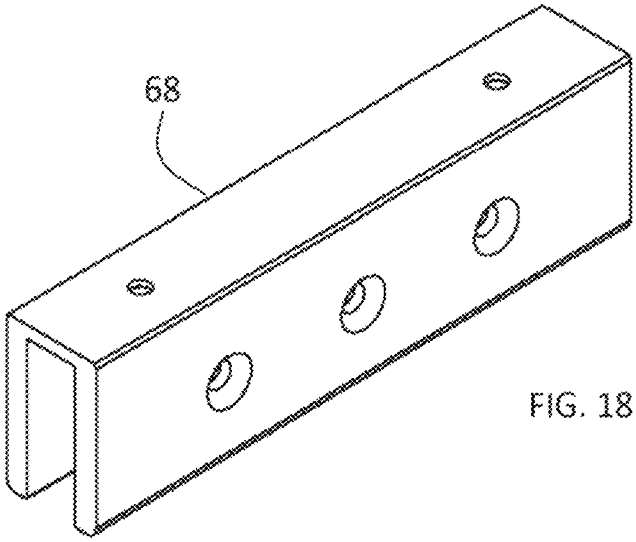
FIG. 18 is a perspective view of a mounting bracket of the shield assembly.

To enable the raising, lowering, and other manipulation of the shield assembly of the embodiment, a handle 34 is fixed to the distal end of the axis post 16 in the depictions of FIGS. 5 through 8. Furthermore, to enable the individual manipulation of the first and second radiation shields 12 and 14, handle assemblies 30 and 32 are fixed to distal edges of the first and second radiation shields 12 and 14. As shown in FIG. 8, each handle assembly 30 and 32 comprises a retaining bracket 68 and a handle 66 fixed to the retaining bracket 68. As shown apart in FIG. 18, each retaining bracket 68 has a U-shaped cross section for receiving the edge portion of the respective radiation shield 12 or 14. The handles 66 can be fixed to the retaining brackets 68 and the retaining brackets 68 can be fixed to the shields 12 and 14 by any effective method, including mechanical fasteners as shown, adhesive, or any other mechanism or combination thereof.

So constructed, the overhead radiation barrier 10 enables the selective and adjustable protection of an operator in an effective manner against direct and scattered radiation from multiple directions simultaneously. The radiation shield assembly formed by the first and second shields 12 and 14 can be readily adjusted between a closed, storage configuration, potentially spaced from a treatment table 100, and continuously variable use configurations selectively protective of medical personnel. Use configurations can be dependent on any relevant factor, including the procedure at hand, the medical equipment employed, and the body of the patient being treated. The operator can create and adjust the profile, size, and shape of the radiation safe area provided by the overhead radiation barrier 10 by selective adjustment of the multiple radiation shields, in this case first and second shields 12 and 14. By use of the adjustable, hinged radiation shields 12 and 14, medical personnel can continually adjust and maximize protection against both primary and scattered radiation during angiographic, X-ray fluoroscopic, interventional angiographic, and other medical procedures that require the active use of X-ray fluoroscopy or other forms of ionizing radiation.

Figure 21:
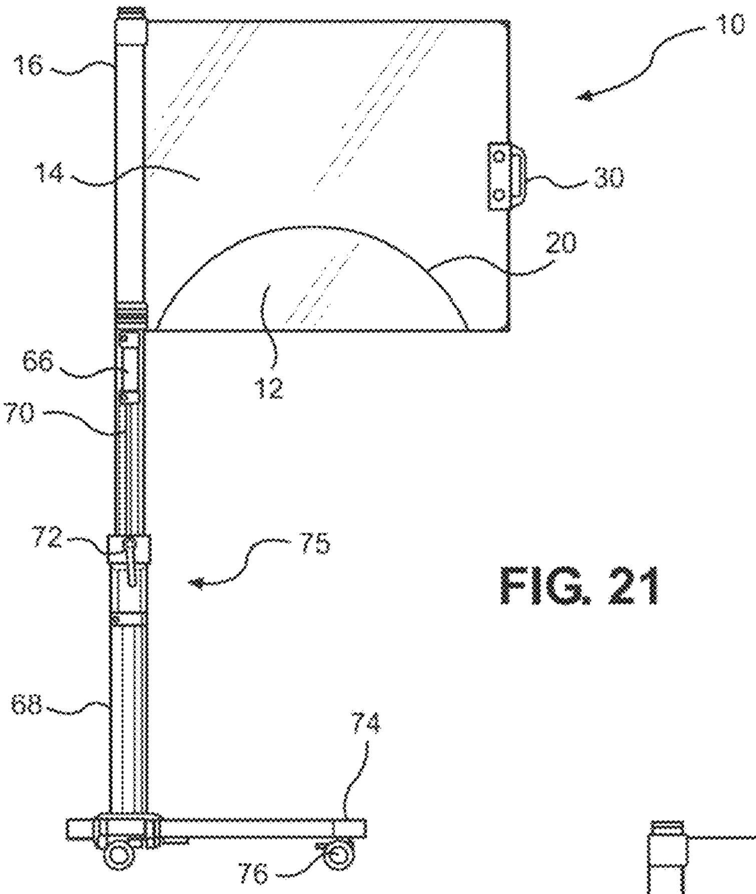
FIG. 21 is a view in front elevation of an alternative embodiment of the adjustable, multi-panel radiation barrier in a raised position.
Figure 22:
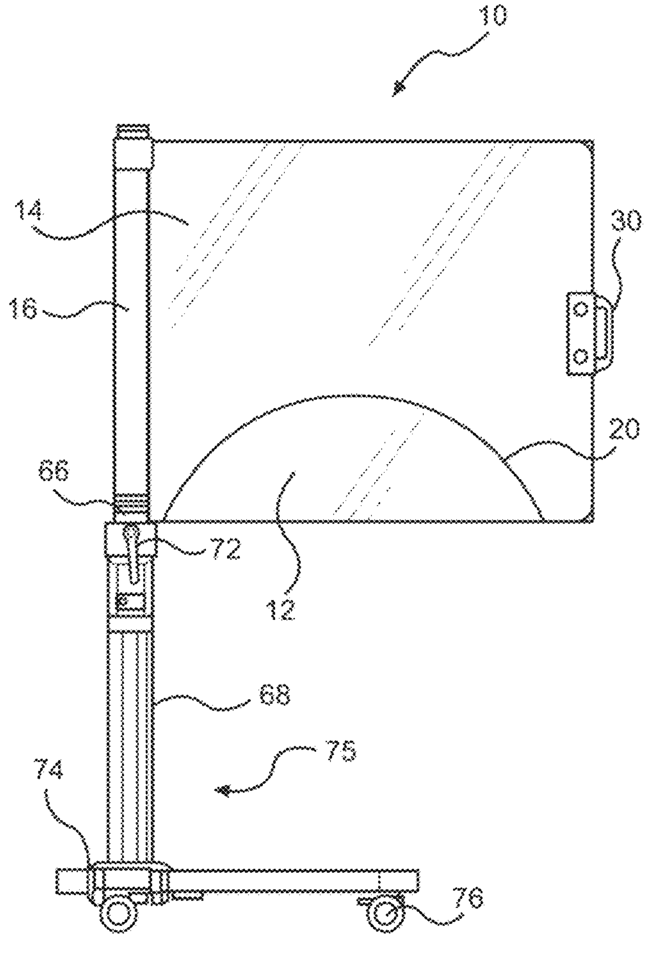
FIG. 22 is a view in front elevation of the adjustable, multi-panel radiation barrier of FIG. 21 in a lowered position.

As discussed above, the adjustable, multi-panel radiation barrier 10 is subject to multiple manifestations within the scope of the invention. One alternative embodiment is shown in FIGS. 21 and 22 where the radiation barrier 10 is again indicated generally at 10. The radiation barrier 10 has first and second radiation shields 12 and 14 that are hingedly supported by an axis post 16 to form a shield assembly. In the present embodiment, however, the axis post 16 and the shield assembly are retained by a floor-supported mast 75. With that, the radiation barrier 10 is mobile. In use of the radiation barrier 10, the shield assembly can be readily repositioned between a collapsed, storage configuration and an expanded, use configuration. The radiation barrier 10 thus provides adjustable protection against radiation coming from multiple directions simultaneously during medical procedures involving the operation of radiographic equipment.

The first and second radiation shields 12 and 14 are again formed from a transparent radiation shielding material, which could be any transparent radiation shielding material that now exists or that may hereafter be developed. As above, the radiation shields 12 and 14 will preferably be formed from transparent lead acrylic material or lead glass material with approximately 1.0 mm lead equivalence. It will again be understood that greater or lesser equivalence may be incorporated. The first radiation shield 12 is again generally rectangular with upper and lower rectangular corner notches in what may be considered the upper and lower proximal corners thereof. As FIG. 20 illustrates, the second radiation shield 14 is also generally rectangular but does not have corner notches in the proximal end portion thereof. The proximal end portions of the shields 12 and 14 are pivotally coupled to the axis post 16. An arcuate receiving indentation 20 is disposed in the lower peripheral edge of the second radiation shield 14 to accommodate, for instance, the torso, legs, or other body portion of a patient.

Figure 26:
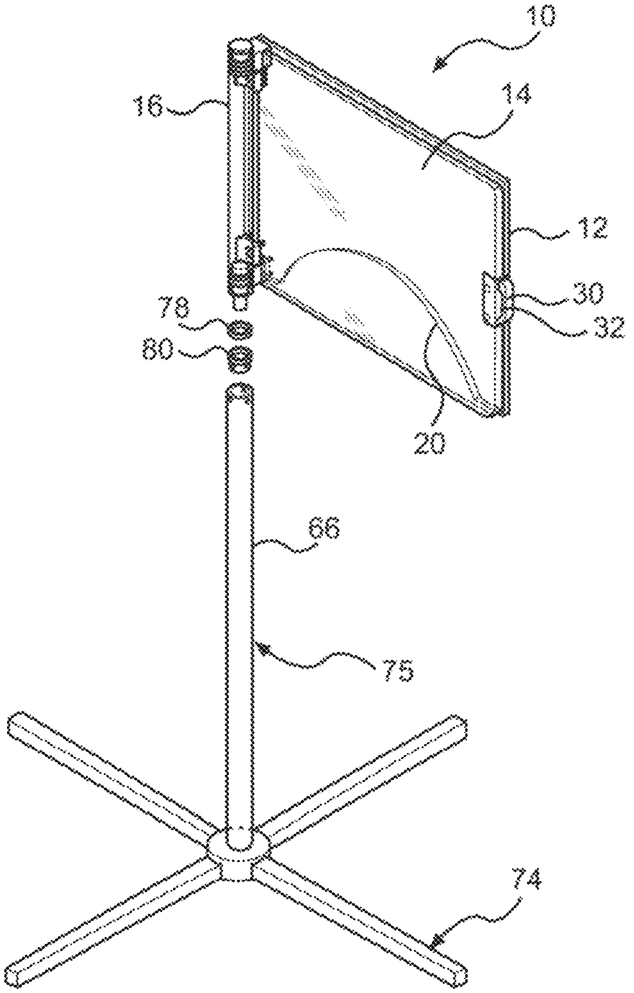
FIG. 26 is a partially exploded perspective view of an alternative embodiment of the adjustable, multi-panel radiation barrier.

The first and second radiation shields 12 and 14 are pivotable in relation to one another and in relation to the axis post 16. The first and second radiation shields 12 and 14 have a fully-closed configuration in which the shields 12 and 14 are disposed in parallel, matching orientations fully overlapping one another. In the fully-closed configuration, the facing surfaces of the first and second radiation shields 12 and 14 are disposed in substantially parallel planes and in immediate proximity to one another. The fully-closed configuration may, for instance, be used during storage of the radiation barrier 10 or where the enhanced protection provided by double shield layers may be desired. The first and second radiation shields 12 and 14 can alternatively be positioned in a fully-extended configuration where the shields 12 and 14 extend in 180-degree opposition. Moreover, the shields 12 and 14 can be individually and collectively pivoted to pursue any configuration, including any angular relationship between the zero degree, fully-closed configuration and a near or actual 360-degree pivoting of either or both shields 12 and 14. To facilitate that pivoting, handle assemblies 30 and 32 are fixed to distal edges of the first and second radiation shields 12 and 14 as best seen in FIG. 26. The shield assembly is thus capable of providing radiation protection over widely varied positions and orientations along and in relation to a treatment table or any other location.

Figure 23:
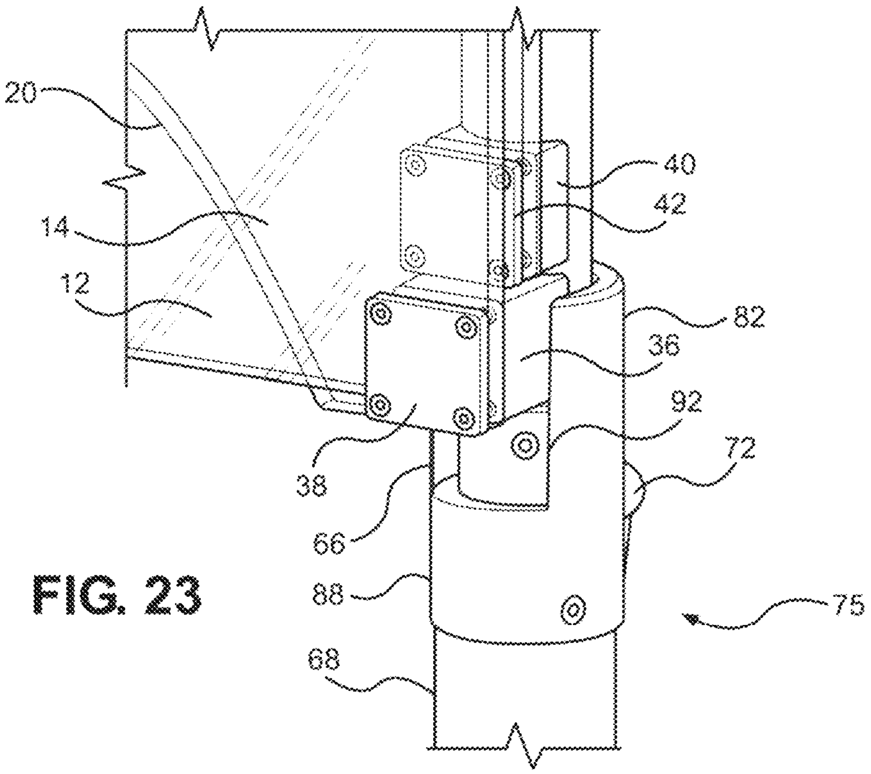
FIG. 23 is a perspective view of a height locking mechanism and shield assembly rotation lock of an embodiment of the radiation barrier.

The present embodiment of the radiation barrier 10 again employs a nesting plate configuration that enables the first and second shields 12 and 14 to be positioned in immediate proximity to one another with the hinge components fixed to the proximal end portion of the second shield 14 received through upper and lower rectangular corner notches in the proximal end portion of the first shield 12. With further reference to FIG. 23, the first shield 12 is again pivotally retained relative to the axis post 16 by upper and lower mounting brackets 40 together with upper and lower mounting plates 42 with the proximal end portion of the first shield 12 disposed therebetween. Fasteners pass through the mounting plates 42, the proximal end portion of the first shield 12, and the mounting brackets 40 to engage upper and lower rotatable covers of the axis post 16. The second shield 14 is similarly pivotally retained relative to the axis post 16 by upper and lower mounting brackets 36 together with upper and lower mounting plates 38 with the second shield 14 disposed therebetween. Fasteners pass through the mounting plates 38, the proximal end portion of the second shield 14, and the mounting brackets 36 to engage the outer shaft of the axis post 16. The proximal end portions of the first and second shields 12 and 14 are thus both disposed to a single side of the axis post 16 when the first and second radiation shields 12 and 14 are in the fully-closed configuration with the first shield 12 disposed inward of or interior to the second shield 14. Each mounting bracket 36 and 40 again has an arcuate inner portion for conforming to and engaging the annular axis post 16, and each mounting plate 38 and 42 has a flat surface for contacting the planar surfaces of the first and second shields 12 and 14.

The mounting plates 42 and the mounting brackets 40 of the first shield 12 are disposed along the axis post 16 longitudinally interior to the rectangular notches in the proximal end portion of the first shield 12, and the mounting plates 38 and the mounting brackets 36 of the second shield 14 are disposed to align longitudinally with the rectangular notches in the first shield 12. Thus, when the first and second shields 12 and 14 are disposed in a fully closed configuration as in FIG. 23, the upper and lower brackets 36 fixed to the proximal end portion of the second shield 14 are received to pass into and through the rectangular notches in the proximal end portion of the first shield 12.

As referenced above, each of the first and second shields 12 and 14 is selectively pivotable about the axis post 16. The axis post 16 can again be considered to have a center axis A, and the first radiation shield 12 pivots about the axis post 16 in a plane laterally displaced from the center axis A by a radial distance $D_1$ while the second radiation shield 14 pivots about the axis post 16 in a plane laterally displaced from the center axis A by a radial distance $D_2$. The distance $D_2$ is greater than the distance $D_1$ by a dimension sufficient to permit the first radiation shield 12 to be pivoted into position interior to and in immediate facing juxtaposition with the second radiation shield 14 and in a plane parallel thereto. To establish this relationship, the mounting brackets 36 of the second shield 14 have a depth greater than the depth of the mounting brackets 40 of the first shield 12 by a dimension corresponding to the difference between the distance $D_2$ and the distance $D_1$.

Although not shown in relation to the present embodiment, the receiving indentation 20 can be lined with a flexible radiation skirt 22 with radiation shielding properties thereby to shield against transmitted radiation. For instance, the radiation skirt 22 can be formed from radiation shielding material. Additionally or alternatively, radiation shielding material, such as lead lining, can be incorporated into the radiation skirt 22.

Figure 27:
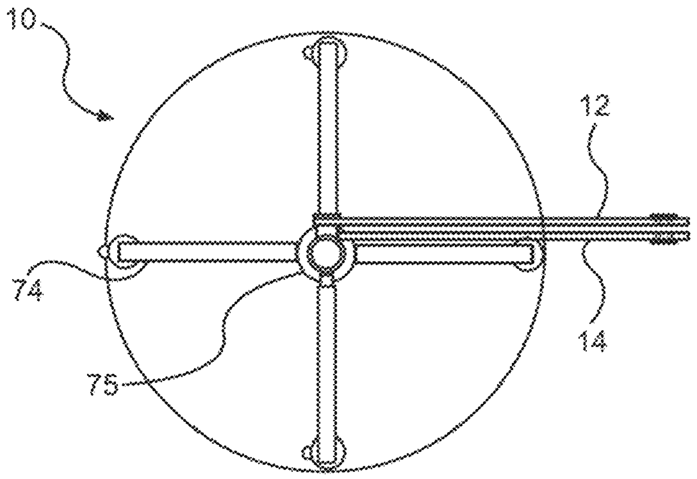
FIG. 27 is a top plan view of an adjustable, multi-panel radiation barrier according to the invention.

As mentioned above, the axis post 16 and the shield assembly in the depicted embodiment are retained by a floor-supported mast 75. In the embodiment of FIGS. 26 and 27, the mast 75 has a unitary mast section 66 that is supported by a base 74 formed by a plurality of radiating legs. As in FIGS. 21 and 22, the base 74 can be supported by a plurality of caster wheels 76, or the caster wheels 76 can be foregone as in the embodiment of FIG. 26. A hub 80 is disposed atop the mast section 66, and a thrust roller ball bearing pack 78 is disposed atop the hub 80 to support the axis post 16, such as via the lower internal shaft 60, and thus the first and second shields 12 and 14 in a readily rotatable manner.

In the radiation barrier 10 of FIGS. 21 and 22, the mast 75 is formed with an upper mast section 66 that is telescopingly received into a lower mast section 68. A pneumatic lift mechanism 70 is disposed within the mast 75 to selectively raise and lower the upper mast section 66 relative to the lower mast section 68 and thus to raise and lower the shield assembly formed by the first and second shields 12 and 14. A height locking mechanism 72 permits the selective locking of the upper mast section 66 at a given degree of extension relative to the lower mast section 68. Thus, the shield assembly can be selectively retained at a given height.

Figure 24:
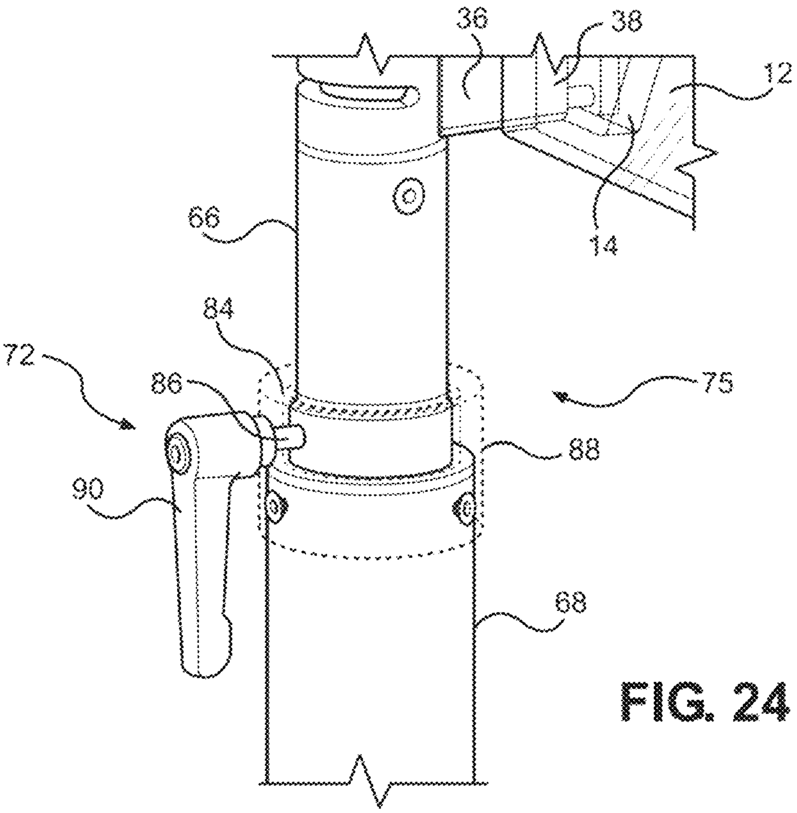
FIG. 24 is an alternative perspective view of a height locking mechanism of an embodiment of the radiation barrier.
Figure 25:
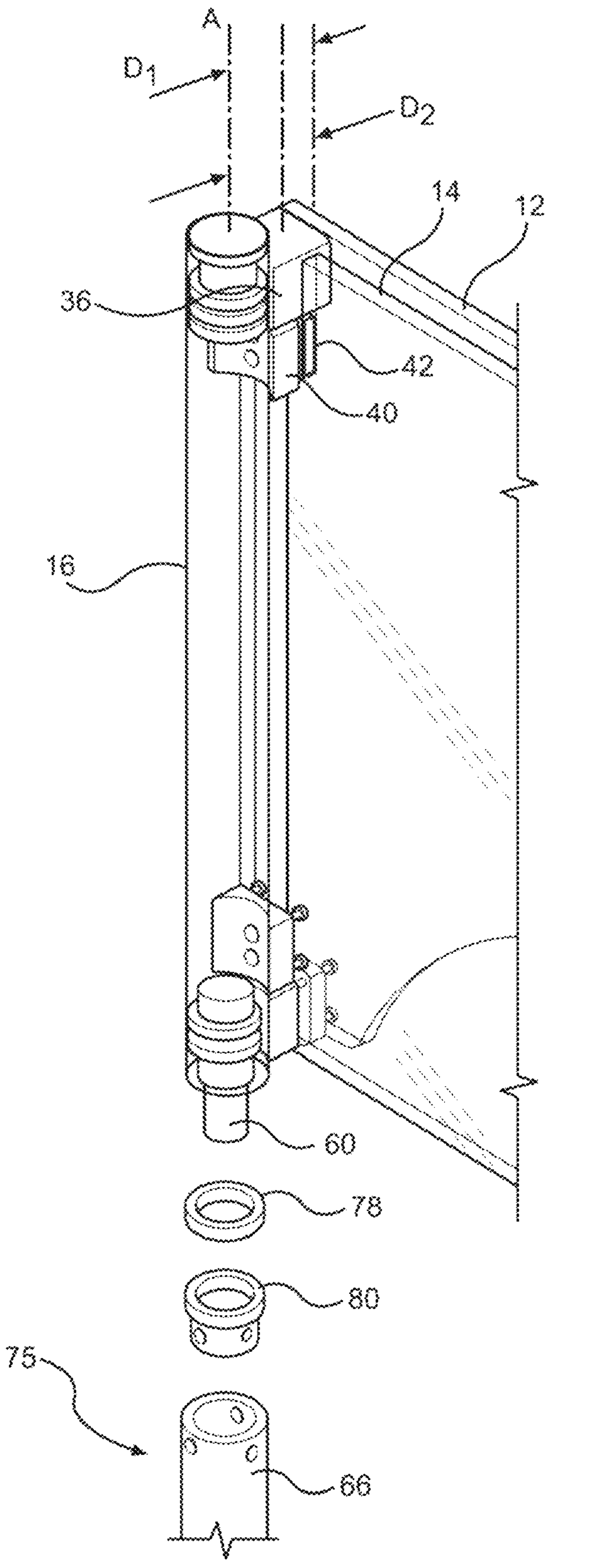
FIG. 25 is a partially exploded perspective view of a shield assembly of an adjustable, multi-panel radiation barrier according to the invention.

In the embodiment depicted in FIG. 24, the height locking mechanism 72 comprises a setscrew 86 that is threadedly engaged with a collar 88. The collar 88 is fixed relative to the lower mast section 68. The setscrew 86 is operable by a handle 90, and a split locking ring 84 is interposed between the collar 88 and the upper mast section 66. As such, the locking mechanism 72 can be operated to fix the upper mast section 66 against extension and retraction thereby to fix the shield assembly at a desired height.

As shown in FIG. 23, it is further contemplated that the radiation barrier 10 can incorporate a rotation lock to fix the first and second shields 12 and 14 against inadvertent pivoting relative to the axis post 16, such as during transport or storage of the radiation barrier 10. In the embodiment of FIG. 23, the rotation lock is formed by a reception slot 92 cut into the collar 88. The reception slot 92 is sized to receive the lower mounting brackets 36 and 40 of the first and second shields 12 and 14. Consequently, when the upper mast section 66 is sufficiently retracted, the lower mounting bracket 36 of the second shield 14 and potentially the lower mounting bracket 40 of the first shield 12 will be slid into the reception slot 92 thereby to fix the shield assembly against rotation.

Under such constructions, the radiation barrier 10 is fully mobile and capable of providing selective and adjustable protection to an operator against direct and scattered radiation from multiple directions simultaneously. The radiation shield assembly can be readily raised, lowered, locked against rotation, and permitted to rotate between a closed, storage configuration and continuously variable use configurations selectively protective of medical personnel. The operator can create and adjust the location, profile, size, and shape of the radiation safe area provided by the radiation barrier 10 by selective repositioning of the barrier 10 and selective adjustment of the multiple radiation shields. Protection can be adjusted and maximized against both primary and scattered radiation during angiographic, X-ray fluoroscopic, interventional angiographic, and other medical procedures that require the active use of X-ray fluoroscopy or other forms of ionizing radiation.

It will be understood that terms of orientation, nomenclature, and other conventions used herein merely provide a complete understanding of the disclosed overhead radiation barrier 10 and are not limiting. Other conventions may be used without limitation of the teachings herein. Furthermore, the various components disclosed herein are merely illustrative and are not limiting of the invention. For example, except as limited by the claims, each of the components and steps discussed herein may include subcomponents or sub-steps that collectively provide for the structure and function of the disclosed component or step. Still further, one or more components or steps, sometimes referred to as members or otherwise herein, could be combined as a unitary structure or a single step while still corresponding to the disclosed components or steps. Additional components and steps that provide additional functions, or enhancements to those introduced herein, may be included. For example, additional components, steps, and materials, combinations of components, steps, or materials, and perhaps the omission of components, steps, or materials may be used to create embodiments that are nonetheless within the scope of the teachings herein.

When introducing elements of the present invention or embodiments thereof, the articles "a," "an," and "the" are intended to mean that there are one or more of the elements. The terms "comprising," "including," and "having" are intended to be inclusive such that there may be additional elements other than the listed elements. As used herein, the term "example" or "exemplary" is not intended to imply a superlative example. Instead, "exemplary" refers to an embodiment that is one of many possible embodiments.

With certain details and embodiments of the present invention for an overhead radiation barrier 10 disclosed, it will be appreciated by one skilled in the art that numerous changes and additions could be made thereto without deviating from the spirit or scope of the invention. This is particularly true when one bears in mind that the presently preferred embodiments merely exemplify the broader invention revealed herein. Accordingly, it will be clear that those with major features of the invention in mind could craft embodiments that incorporate those major features while not incorporating all of the features included in the preferred embodiments.

Therefore, the following claims shall define the scope of protection to be afforded to the invention. Those claims shall be deemed to include equivalent constructions insofar as they do not depart from the spirit and scope of the invention. A plurality of the following claims may express, or be interpreted to express, certain elements as means for performing a specific function, at times without the recital of structure or material. As the law demands, any such claims shall be construed to cover not only the corresponding structure and material expressly described in this specification but also all legally-cognizable equivalents thereof.

I claim the following as deserving the protection of Letters Patent:

1. An adjustable radiation barrier for providing adjustable protection during radiographic procedures against radiation incident from multiple directions simultaneously, the radiation barrier comprising:

an axis post;

a first radiation shield of radiation shielding material with a lead equivalence, wherein the first radiation shield has a proximal end portion and a distal end portion and wherein the first radiation shield is pivotally retained by the axis post; and a second radiation shield of radiation shielding material with a lead equivalence, wherein the second radiation shield has a proximal end portion and a distal end portion, wherein the second radiation shield is pivotally retained by the axis post, and wherein the first and second radiation shields together form a radiation shield assembly;

wherein the first and second radiation shields are selectively pivotable in relation to one another to permit an adjustment of a profile, size, and shape of a radiation protective area provided by the radiation barrier;

wherein the first and second radiation shields have a closed configuration wherein the first and second radiation shields are disposed in a nesting relationship with the proximal end portions of both the first and second radiation shields disposed to a single side of the axis post and with the first radiation shield disposed interior to the second radiation shield, wherein the axis post has a center axis, wherein the first radiation shield pivots about the axis post in a plane laterally displaced from the center axis by a distance D1, wherein the second radiation shield pivots about the axis post in a plane laterally displaced from the center axis by a distance D2, wherein the distance D2 is greater than the distance D1 by a dimension sufficient to permit the first radiation shield to be pivoted into position interior to and in immediate facing juxtaposition with the second radiation shield in a plane parallel thereto, wherein the first radiation shield is pivotally retained relative to the axis post by upper and lower mounting brackets, wherein the second radiation shield is pivotally retained relative to the axis post by upper and lower mounting brackets, and wherein one of the first and second radiation shields has notches in the proximal end portion thereof for receiving the mounting brackets of the other of the first and second radiation shields therethrough when the first and second radiation shields are disposed in the closed configuration.

2. The radiation barrier of claim 1, further comprising a support arm wherein the axis post is retained by the support arm.

3. The radiation barrier of claim 2, further comprising an arm support operative to support the support arm, wherein the support arm has a proximal arm section and a distal arm section, wherein the proximal arm section is pivotable about perpendicular and horizontal axes in relation to the arm support, wherein the distal arm section is pivotable in relation to the proximal arm section, and wherein the proximal arm section and the distal arm section have parallel movement mechanisms.

4. The radiation barrier of claim 1, wherein the first and second radiation shields are formed from transparent lead acrylic with a lead equivalence of at least approximately 0.3 mm.

5. The radiation barrier of claim 1, wherein the at least one of the first and second radiation shields has a receiving indentation disposed in a lower portion thereof adapted to engage a body of a patient.

6. The radiation barrier of claim 5, wherein the receiving indentation is lined with a flexible skirt and wherein the flexible skirt incorporates radiation shielding material.

7. The radiation barrier of claim 1, wherein the mounting brackets that pivotally retain the second radiation shield have a depth greater than a depth of the mounting brackets that pivotally retain the first radiation shield by a dimension corresponding to the difference between the distance D2 and the distance D1.

8. The radiation barrier of claim 1, wherein the notches are disposed in the proximal end portion of the first radiation shield for receiving the mounting brackets of the second radiation shield therethrough.

9. The radiation barrier of claim 8, wherein the notches are disposed in upper and lower corners of the proximal end portion of the first radiation shield and wherein the upper and lower mounting brackets that pivotally retain the second radiation shield are positioned to be received through the notches in the upper and lower corners of the proximal end portion of the first radiation shield when the first and second shields are in the closed configuration.

10. The radiation barrier of claim 9, wherein the mounting brackets that pivotally retain the first radiation shield are disposed longitudinally interior to the notches disposed in the upper and lower corners of the proximal end portion of the first radiation shield.

11. The radiation barrier of claim 1, further comprising a support mast wherein the axis post is retained by the support mast.

12. The radiation barrier of claim 11, wherein the support mast comprises a distal mast section that is telescopingly received into a proximal mast section and further comprising a height locking mechanism operative to selectively lock the distal mast section at a given degree of extension relative to the proximal mast section.

13. An adjustable radiation barrier for providing adjustable protection during radiographic procedures against radiation incident from multiple directions simultaneously, the radiation barrier comprising:

an axis post;

a support mast wherein the axis post is retained by the support mast, wherein the support mast comprises a distal mast section that is telescopingly received into a proximal mast section;

a height locking mechanism operative to selectively lock the distal mast section at a given degree of extension relative to the proximal mast section;

a first radiation shield of radiation shielding material with a lead equivalence, wherein the first radiation shield has a proximal end portion and a distal end portion and wherein the first radiation shield is pivotally retained by the axis post;

a second radiation shield of radiation shielding material with a lead equivalence, wherein the second radiation shield has a proximal end portion and a distal end portion, wherein the second radiation shield is pivotally retained by the axis post, and wherein the first and second radiation shields together form a radiation shield assembly;

wherein the first and second radiation shields are selectively pivotable in relation to one another to permit an adjustment of a profile, size, and shape of a radiation protective area provided by the radiation barrier; and a rotation lock operative to selectively fix the first and second radiation shields against pivoting relative to the axis post, wherein the rotation lock comprises a reception slot fixedly retained by the proximal mast section.

14. An adjustable radiation barrier for providing adjustable protection during radiographic procedures against radiation incident from multiple directions simultaneously, the radiation barrier comprising:

an axis post with a center axis;

a first radiation shield of radiation shielding material with a lead equivalence, wherein the first radiation shield has a proximal end portion and a distal end portion and wherein the first radiation shield is pivotally retained by the axis post; and a second radiation shield of radiation shielding material with a lead equivalence, wherein the second radiation shield has a proximal end portion and a distal end portion, wherein the second radiation shield is pivotally retained by the axis post, and wherein the first and second radiation shields together form a radiation shield assembly;

wherein the first and second radiation shields are selectively pivotable in relation to one another to permit an adjustment of a profile, size, and shape of a radiation protective area provided by the radiation barrier;

wherein the first radiation shield pivots about the axis post in a plane laterally displaced from the center axis by a distance D1, wherein the second radiation shield pivots about the axis post in a plane laterally displaced from the center axis by a distance D2, wherein the distance D2 is greater than the distance D1 by a dimension sufficient to permit the first radiation shield to be pivoted into position interior to and in immediate facing juxtaposition with the second radiation shield in a plane parallel thereto, and wherein the first and second radiation shields have a closed configuration wherein the first and second radiation shields are disposed in a nesting relationship with the proximal end portions of both the first and second radiation shields disposed to a single side of the axis post and with the first radiation shield disposed interior to the second radiation shield;

wherein the first radiation shield is pivotally retained relative to the axis post by upper and lower mounting brackets, wherein the second radiation shield is pivotally retained relative to the axis post by upper and lower mounting brackets, and wherein the mounting brackets that pivotally retain the second radiation shield have a depth greater than a depth of the mounting brackets that pivotally retain the first radiation shield by a dimension corresponding to the difference between the distance D2 and the distance D1, and wherein one of the first and second radiation shield has notches in the proximal end portion thereof for receiving the mounting brackets of the other of the first and second radiation shields therethrough when the first and second radiation shields are disposed in the closed configuration.

15. The radiation barrier of claim 14, wherein the first and second radiation shields are formed from transparent lead acrylic with a lead equivalence of at least approximately 0.3 mm.

16. The radiation barrier of claim 14, wherein the first and second radiation shields have an extended configuration where the first and second radiation shields extend in 180-degree opposition.

17. The radiation barrier of claim 14, wherein the notches are disposed in the proximal end portion of the first radiation shield for receiving the mounting brackets of the second radiation shield therethrough.

18. The radiation barrier of claim 17, wherein the notches are disposed in upper and lower corners of the proximal end portion of the first radiation shield and wherein the upper and lower mounting brackets that pivotally retain the second radiation shield are positioned to be received through the notches in the upper and lower corners of the proximal end portion of the first radiation shield when the first and second shields are in the closed configuration.

19. The radiation barrier of claim 18, wherein the mounting brackets that pivotally retain the first radiation shield are disposed longitudinally interior to the notches disposed in the upper and lower corners of the proximal end portion of the first radiation shield.

20. The radiation barrier of claim 14, further comprising a support mast wherein the axis post is retained by the support mast, wherein the support mast comprises a distal mast section that is telescopingly received into a proximal mast section.

21. The radiation barrier of claim 20, further comprising a height locking mechanism operative to selectively lock the distal mast section at a given degree of extension relative to the proximal mast section and a rotation lock operative to selectively fix the first and second radiation shields against pivoting relative to the axis post wherein the rotation lock comprises a reception slot fixedly retained by the proximal mast section.

* * * * *